(No Model.)
J. KELLY.
WHEELBARROW.
No. 263,790. Patented Sept. 5, 1882.
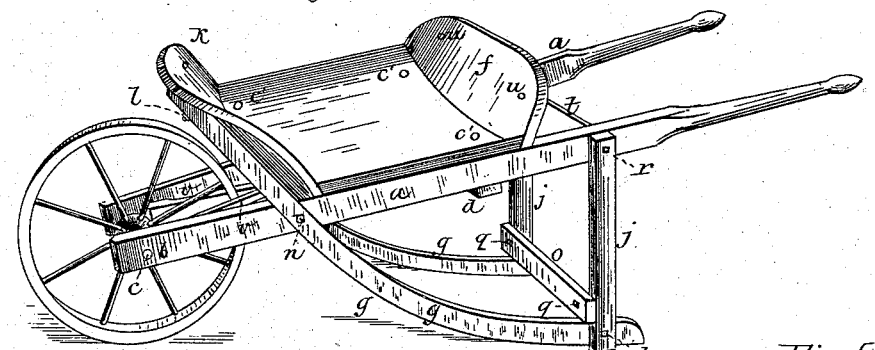
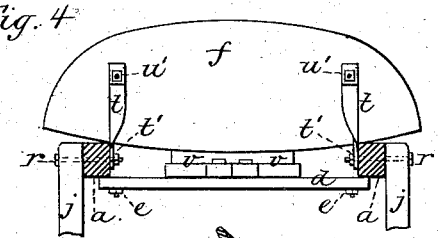
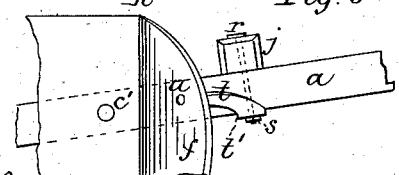
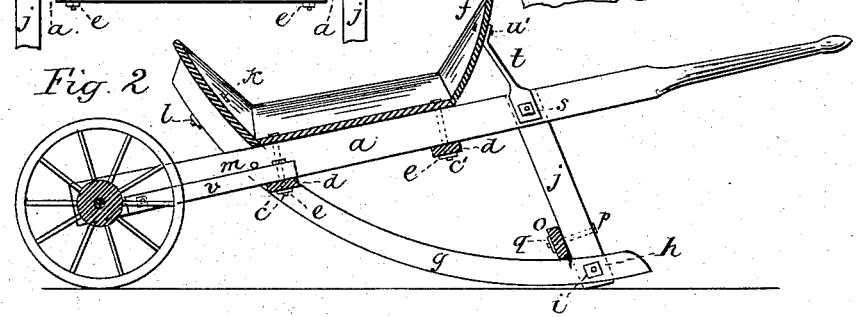
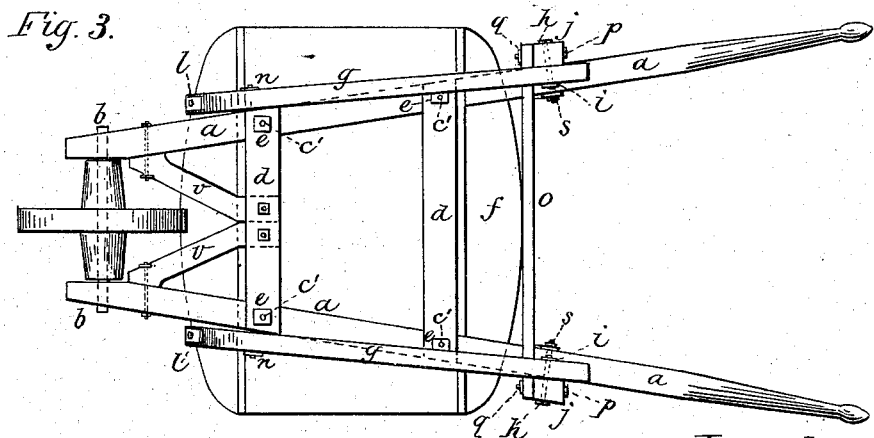
Witnesses
Edmond Broahag
F. L. Browne
Inventor
Joseph Kelly
By Johnson and Johnson
Attys.

UNITED STATES PATENT OFFICE.

JOSEPH KELLY, OF GOSHEN, INDIANA.

WHEELBARROW.

SPECIFICATION forming part of Letters Patent No. 263,790, dated September 5, 1882.

Application filed May 26, 1882. (No model.)

*To all whom it may concern:*

Be it known that I, JOSEPH KELLY, a citizen of the United States, residing at Goshen, in the county of Elkhart and State of Indiana, have invented new and useful Improvements in Wheelbarrows, of which the following is a specification.

My improved wheelbarrow is of the style known as the "tray-barrow," specially adapted for work on roads and railroads. Its construction is such that it may be shipped knocked down and in bundles, all the parts being made in duplicate, and when joined the tray, the handles, and cross-girts beneath the handle-bars are secured by the same screw-bolts holding the barrow perfectly rigid. Angular braces fastened to the rear side of the tray are fastened to the handle-bars by the same screw-bolts which secure the legs thereto, while braces secured to the front cross-girt of the handle-bars extend to and support the wheel-bearing ends thereof against the thrusts in dumping.

My object is to produce a cheap, strong, and durable barrow in which the tray, the legs, and the frame parts are firmly braced and bound together by screw-bolts and nuts.

The accompanying drawings represent a wheelbarrow embracing my improvements, in which Figure 1 shows a view in perspective; Fig. 2, a vertical section; Fig. 3, a bottom view; Fig. 4, a cross-section taken in front of the rear side of the tray, and Fig. 5 a partial top view.

The tray-supporting bars $a\ a$ form also the handles, and are preferably of hard maple, with the bearings for the wheel-pin $b$ formed by bored holes $c$ in the front ends of the handle-bars. The wheel-bearing pin $b$ is driven into and through a bore in the hub, in which it is firmly bound. The bottom of the tray is secured upon the handle-bars by four bolts, $c'$, which, passing through them and through the ends of cross-girts $d\ d$ on the under sides of said bars, are bound firmly with these parts by the nuts $e$, clamped upon the under sides of said cross-girts. The front $f$ of the tray is supported and braced by the curved wooden braces $g$, which are secured by bolts $h$ and nuts $i$ to the lower ends of the legs $j$, and, extending up, are secured by bolts $k$ and nuts $l$ to the front of the tray and by bolts $m$ and nuts $n$ to the outer sides of the handle-bars. The legs are connected at their lower ends by a cross-girt, $o$, secured to them by bolts $p$ and nuts $q$, while the upper ends of the legs are secured to the outer sides of the handle-bars by the same bolts $r$ and nuts $s$ by which the angular braces $t$ for supporting the rear side of the tray are fastened to the handle-bars. The lower ends of these braces $t$, for this purpose, are formed with vertical flat ends $t'$, so as to lie against the inner sides of the handle-bars, while their upper angle ends are secured by bolts $u$ and nuts $u'$ to the rear side of the tray, as shown in Figs. 2 and 4. Besides the economy of using the same bolts and nuts for fastening the legs and braces to the handle-bars, the latter are only thereby pierced horizontally, and are not as liable to break off at this point as if they were also pierced by separate vertical bolts for fastening the braces. The wheel-bearing ends of the handle-bars are braced against the thrusts in dumping by braces $v$, fastened to the middle of the front cross-girt, $d$, and extend to or near the wheel-bearing ends, to which they are bolted, as shown in Fig. 3.

A single bow-brace may be used instead of the separate ones shown; but, of whatever form, the wheel-bearing part of the frame is thereby very materially strengthened and supported from the cross-girt and the wheel given a firmer support.

The curved wooden braces $g$, the angular metal braces $t\ t'$, the front wheel-bearing end braces, $v$, and cross-girts $d$ co-operate to brace the barrow-frame and its tray at all points and to give the structure greater solidity.

I claim—

1. In combination, in a wheelbarrow, the handle-bars $a\ a$, the tray, the curved wooden braces $g$, the metal angular braces $t\ t'$, the cross-girts $d$, and the legs, the said tray and cross-girts being secured to the handle-bars by the same screw-bolts and clamp-nuts and the said metal braces and legs secured to the handle-bars by the same screw-bolts and clamp-nuts, substantially as described.

2. The angular braces $t$, formed with the vertical flat ends $t'$, in combination with the tray, the handle-bars $a$, the legs $j$, the screw-bolts passing through these several parts, and the clamp-nuts binding them together, as set forth.

3. The combination, in a wheelbarrow, of the handle-bars *a* and the cross-girt *d* with a horizontal brace or braces, *v*, secured to the middle of said cross-girt, extending frontward, and secured at or near the wheel-bearings of said handle-bars, substantially as described, for the purpose specified.

4. The wheelbarrow herein described, consisting of the handle-bars *a*, the tray, the curved wooden braces *g*, the angular metal braces *t t'*, the legs *j*, the cross-girts *d d*, and the brace or braces *v* for the wheel-bearing ends of the handle-bars, all constructed and secured together substantially as described.

In testimony whereof I have hereunto set my hand in the presence of two subscribing witnesses.

JOSEPH KELLY.

Witnesses:
ARTHUR G. STORER,
HENRY KELLY.